United States Patent [19]
Eadie

[11] 3,887,478
[45] June 3, 1975

[54] PROCESS FOR PRODUCING ALKALINE EARTH FERRITES

[75] Inventor: Gordon Cunningham Eadie, Wentwood, England

[73] Assignee: British Steel Corporation, London, England

[22] Filed: Apr. 19, 1971

[21] Appl. No.: 135,031

[30] Foreign Application Priority Data
Apr. 20, 1970 United Kingdom............... 18858/70

[52] U.S. Cl.............................. 252/62.63; 423/594
[51] Int. Cl............................................. C04b 35/26
[58] Field of Search ........... 252/62.63, 62.56; 23/51 423/594

[56] References Cited
UNITED STATES PATENTS

| | | | |
|---|---|---|---|
| 2,837,483 | 6/1958 | Hakker et al. | 252/62.63 |
| 3,378,335 | 4/1968 | Ellis et al. | 252/62.56 |
| 3,561,919 | 2/1971 | Ayers | 252/62.56 |

Primary Examiner—Oscar R. Vertiz
Assistant Examiner—J. Cooper
Attorney, Agent, or Firm—Bacon & Thomas

[57] ABSTRACT

A process for producing a ferrite magnetic material of the cubic, hexagonal magnetoplumbite or garnet type comprises mixing with ferric oxide derived from a process involving iron or steel making or working, an activator capable of reacting with the ferric oxide to impart to it the required magnetic characteristics, sintering the mixture at a temperature effective to produce the reaction, and grinding the sintered material to the required particle size.

14 Claims, 1 Drawing Figure

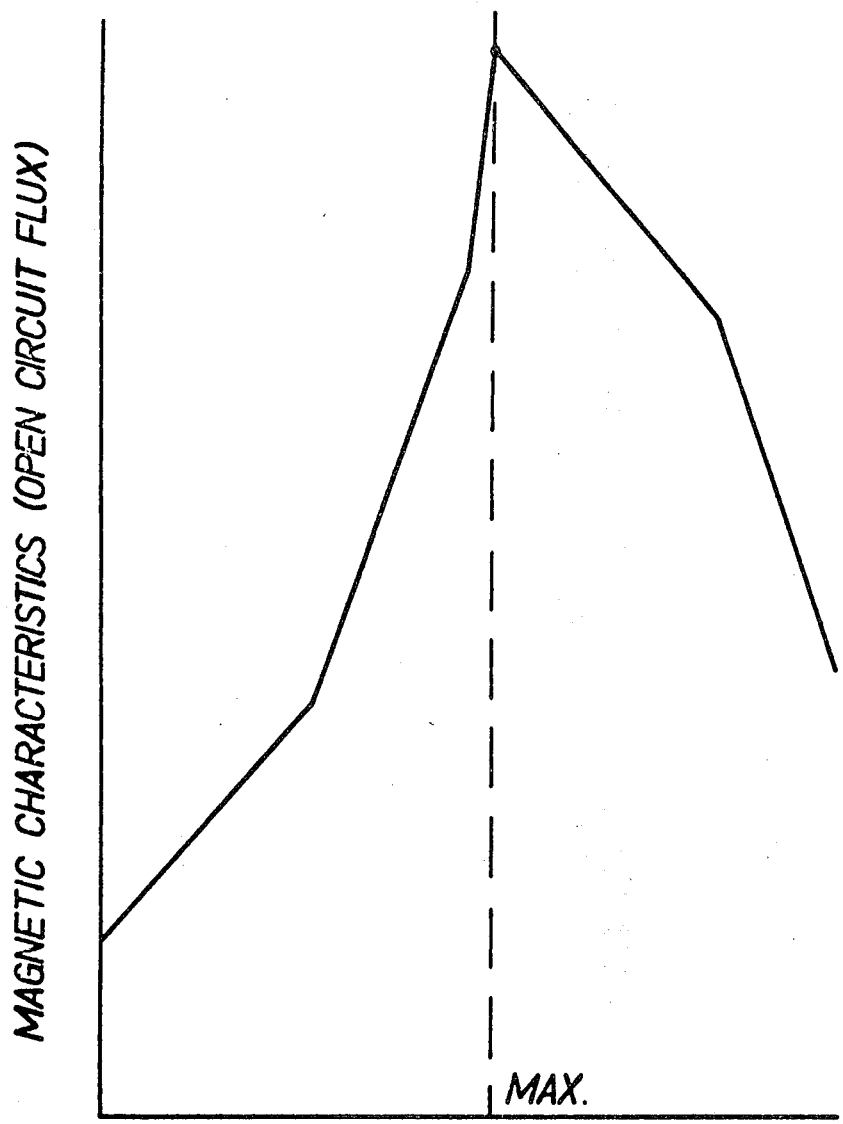

PROCESS FOR PRODUCING ALKALINE EARTH FERRITES

This invention relates to ferrite magnetic materials and to permanent magnets produced from such ferrites. The invention relates also to methods of manufacturing such ferrites and to devices incorporating such magnetic materials and permanent magnets. By ferrite we mean all magnetic material magnetically hard and soft incorporating ferric oxide $Fe_2O_3$ as a basic constituent.

The invention is particularly, but not exclusively, concerned with three main classes of ferrites. These are cubic ferrites producing magnetically soft materials, hexagonal magnetoplumite ferrites suitable for producing magnetically hard magnets together with ferrites of the garnet type also producing magnetically soft materials.

Each of these classes of ferrite have as their basic constituent ferric oxide $Fe_2O_3$. Ferrite material is produced by calcining or sintering a mixture including, in addition to the ferric oxide, an activator which imparts the required magnetic characteristics to the ferric oxide and optionally also a selected additive which determines the class of ferrite produced. Both the activator and the additive may have secondary effects in determining the class and the magnetic characteristics respectively of the ferrite. Other materials, such as binders or fillers, may optionally also be added, for example in the case where the ferrite is intended for moulding to a specific shape.

In the case, for example of magnetoplumbites, known activators are suitable compounds such as the carbonates of strontium, barium or lead which also can be used to activate ferric oxide to produce both cubic ferrites and ferrites of the garnet class. Magnets of the garnet class, for example, may be produced by the use of an additive such as zinc oxide, which may occur naturally in the ferric oxide arising from one or more of the sources of the invention.

The production of ferrites is known to require ferric oxide of a grade of purity which is both relatively high and also substantially consistent. Consistency together with a high degree of purity are considered essential, not only to prevent undersirable activation of the basic material by inherent impurities during heat treatment, thereby producing deviation from the required magnetic characteristics, but also to avoid introducing changes into the processing conditions in order to compensate for variation in impurity content.

A number of grades of ferric oxide satisfying these requirements are used commercially. One such grade, for example, is referred to in U.K. Patent Specification No. 1,172,105. In this case finely divided ferric oxide is produced by the combustion of iron carbonyl $Fe(CO_5)$ in the gas phase. This process is known per se for the purification of iron and achieves a high quality product. It also produces iron oxide which is sufficiently reactive in the ferrite production process, a factor also considered important.

A further grade of pure red iron oxide commercially used is known as pigment grade; bath this and other pure oxides suffer from the disadvantage of relatively high cost arising from the particular purifying treatment used and the selection and/or production process producing the necessary degree of reactivity. This disadvantage becomes particularly significant in the case where ferrites are intended for use as magnets to become incorporated into relatively low cost devices and it is one object of the present invention to overcome this disadvantage.

This disadvantage is ameliorated in the present invention which is based upon the discovery that under specific processing conditions suitable ferrites can be produced from iron oxide with a relative high level of selected impurities many of which differ from those conventionally used as additives and activators. It has surprisingly been found that the selected impurities are those contained in iron oxide derived as a by-product of iron or steel making or steel working processes and that such oxides are adequately reactive (by being, inter alia, in an adequately finely divided form).

The present invention in its broadest aspect provides, a ferrite material including ferric oxide originally in the form of a by-product from any suitable iron or steel making a working process.

The steel making process may extend from and include the processing of the basic iron ore to treatment of the molten iron or steel for purification or alloying. In this case suitable sources of ferric oxide are the electrostatic precipitators or other dust catchers provided to intercept the effluent of a conventional blast furnace or an open hearth furnace or oxygen steel making converter of any known kind.

Alternatively the iron oxide may be derived from any steel working process, for example, from the scale produced on the exposed surface of billets, bar, strip or the like when heated to an oxidising temperature prior to further working.

In the foregoing examples, the ferric oxide is directly obtained from the appropriate steel making or steel working process, that is to say, it emerges from either of these processes in the form of ferric oxide. The present invention includes the case where the ferric oxide is indirectly obtained, that is to say where it emerges from the appropriate steel making or steel working process in a chemically combined form and subsequent treatment is required. An example of indirectly obtained ferric oxide is the pickling of, say, steel sheet to remove oxide scale and to expose a fresh surface suitable, for example, for subsequent cold rolling. In this case the iron oxide may be obtained from the hydrochloric acid liquid used in the pickling process, conveniently when a spray of the liquor is heated to drive off the hydrogen chloride and water.

It has also been found that while some of these inherent impurities are beneficial to the production of ferrites, for example zinc in the case of manganese zinc ferrites many others such as chlorides which might otherwise produce a degradation of magnetic characteristics can be removed in the processing or can be neutralised or compensated for.

According to one aspect of the present invention, a process for producing a ferrite, magnetic material of the cubic, hexagonal magnetoplumbite or garnet type comprising mixing with ferric oxide derived from a process involving iron or steel making or working, an activator capable of reacting with the ferric oxide to impart to it the required magnetic characteristics, sintering the mixture at a temperature effective to produce the reaction, and grinding the sintered material to the required particle size.

Conveniently the material comprises one or more of the activators already used to achieve the desired magnetic characteristics required in the final ferrite. In this case the quantity of activator added is in excess of that which would normally be required purely for activation purposes alone, in accordance with the ferric oxide content in the initial mix.

The additional quantity of activator or the material added is determined according to the estimated quantity of impurities to be neutralised or compensated for and may be calculated from the general formula.

$$\frac{(100-P)(200-P)}{100} + 20\%$$

Here $P$ is the percentage purity of the ferric oxide used when lower than 98%.

mix is to produce reactions between the ferric oxide and the activator or activators in addition to determine optimum temperature and time required for the main sintering operation to produce optimum magnetic characteristics. It has been found that in order to obtain the required optimum magnetic properties in the final ferrite, the main sinter temperature should reflect the grain size and the related appearance of the mix after the presintering operation. Alternatively the temperature may remain constant irrespective of appearance and the sinter time may be varied to produce constant characteristics. Table 1 shows how the main sinter temperature is dependent upon the initial sinter condition and is selected to lie between 1200°C and 1400°C to obtain optimum magnetic-characteristics.

Table 1

| Appearance of Powder when cool after Presinter (1000°C, 20 Mins.) | Grain Diameter | Grain Thickness | Suitable Final Sintering Temperature |
|---|---|---|---|
| Light Brown/Red identical with the powder before presintering. | 1μ–1/100μ | 1 < 1/100μ | 1350°C to 1400°C |
| Dark Purple loose powder | 2μ–1/50μ | 1 < 1/50μ | 1300°C |
| Dark Purple/Black loose powder but shrunk from sides of the boat. | 2μ–1/10μ | 1 < 1/10μ | 1275°C |
| Black sintered into lumps occupying only 50% or less of space filled before pre-sinter | 10μ–1/10μ | 1 < 1/10μ | 1200°C |

In the case where strontium or barium carbonate are added as an activator to the initial ferric oxide mix, an additional quantity based on the formula recited above is added. However, an additional quantity of any suitable activator or a quantity of suitable material other than an activator can be utilised in accordance with this aspect of the present invention. A mixture of activators can also be used without departing from the invention of this case.

The purity of ferric oxide produced according to the invention varies between 55 and 96% in contrast to a purity of greater than 99% commonly achieved and considered necessary in ferric oxide conventionally used for the production of ferrites.

Embodiments of the invention will now be particularly described by way of example with reference to Tables 1 to 8. and to FIG. 1.

The examples hereinafter described are directed at the production of magnetoplumbite ferrites having the general formula Me (Fe₂O₃) where Me is constituted by one or more of the ions barium and strontium. In each case the ferric oxide is mixed with commercial grade strontium carbonate or barium carbonate powder which is of adequate purity as shown in Table 8 and the mix is initially fired at about 1000°C for some 20 minutes to effect calcining or presintering of the mix. It has been found that, due to the nature of the ferric oxide starting material, no grinding of the mix or of any of its individual compounds is necessary prior to this initial firing operation. The presintering is effected in a furnace of a conventional kind which allows an approximately 30 seconds entry time to the hot zone together with a 15 seconds exit time from the zone.

The effect of this presinter or calcining of the ferrite

The powder mix after presinter is ground and subsequently compacted into the preferred shape in a suitable press with or without an orienting field. Compaction is followed by the main sinter operation at the selected temperature between 1200°C and 1400°C after which the sample is magnetised by any of the electromagnetic means well known in the art.

The following subsequent examples are directed at the production of magnetoplumbite ferrites from ferric oxide derived from various sources in a steel making and steel working process. In all these examples, the quantity of activator, namely strontium or barium carbonate, is in excess of the optimum mix ratio based on the assumption that ferric oxide used is of substantially 100% purity.

The FIGURE shows the variation of magnetic characteristics with the quantity of activator, any active or other material which is added to the ferric oxide starting material. The abscissa represents the quantity of activator necessary to provide the appropriate mix ratio according to the quantity of ferric oxide derived from analyse; present. Empirically, the quantity of activator to provide this mix ratio should decrease as the ferric oxide content reduces with increasing impurity content.

In accordance with the invention and in contrast to the foregoing an excess quantity of activator is added to correspond to the peak on the curve shown in the FIGURE. Greater or lesser quantities of excess produce deviation from the optimum magnetic characteristics and appear to indicate that the excess bears some relation to the impurity content. Thus instead of reducing activator as impurity increases activator is increased in accordance with impurity content.

EXAMPLE 1

Ferric oxide derived as fine dust from the treatment of "Hammersley" iron ore was mixed with barium carbonate in a mix ratio of 1:3 of barium carbonate to ferric oxide. The ferric oxide having a purity of approximately 81.6% based upon the analysis shown in Table 2 was presintered and subsequently sintered at 1200°C for 1½ hours after compaction producing a density of 4.6 g/cm³. The sample, after magnetisation, was found to display an open circuit flux of 340 gauss in the isotropic condition.

Table 2

| Content | Percentage |
| --- | --- |
| FeO | 0.52 |
| $Fe_2O_3$ | 81.65 |
| $P_2O_3$ | 2.94 |
| $SiO_2$ | 6.74 |
| CaO | 1.00 |
| MgO | 0.22 |
| S | 0.05 |
| P | 0.04 |
| Mn | 0.08 |

A similar sample of fine dust mixed with strontium carbonate in a mix ratio of 1:4.0 was sintered at 1150°C for 1½ hours and subsequently compacted to a density of 4.4 g/cm³. This again produced a magnet with an open circuit flux of 370 gauss in the isotropic condition.

EXAMPLE 2

Ferric oxide derived from the dust catchers of an open hearth steel making plant was mixed with barium carbonate in a mix ratio of 1:2.5. The ferric oxide having a purity of approximately 68.6% based upon analysis as shown in Table 3 was presintered and subsequently was mixed with zinc additive in the form of zinc oxide to produce a ferrite of the cubic type. The final zinc innoculated mix was sintered at 1250°C for 1½ hours prior to compaction producing a density of 4.6 g/cm³. The sample, after magnetisation, was isotropic.

Table 3

| Content | Percentage |
| --- | --- |
| FeO | 0.9 |
| $Fe_2O_3$ | 68.64 |
| $Al_2O_3$ | 2.82 |
| $S_iO_2$ | 0.88 |
| CaO | 1.50 |
| MgO | 1.33 |
| $SO_3$ | 6.15 |
| P | 0.26 |
| Mn | 0.38 |
| Zn | 5.51 |

A similar sample derived from the dust catchers of an open hearth steel making plant was mixed with strontium carbonate in a mix ration of 1:3.4. The ferric oxide having a purity of approximately 68.6% based upon the analysis shown in Table 3 was sintered at 1150°C for 1½ hours and subsequently compacted to a density of 4.2 g/cm³. This again produced a magnetically soft material.

EXAMPLE 3.

Ferric oxide derived from the hydrochloric acid mother liquor of a pickling plant was mixed with barium carbonate in a mix ratio of 1:3.5. The ferric oxide having a purity of approximately 92.2% based upon analysis as shown in Table 4 was presintered and subsequently sintered at 1335°C for 1½ hours prior to compacting to produce a density of 4.7 g/cm³. The sample, after magnetisation, was found to display an open circuit flux of 230 gauss in the isotropic condition.

Table 4

| Content | Percentage |
| --- | --- |
| FeO | 1.42 |
| $Fe_2O_3$ | 92.24 |
| $SiO_2$ | 0.15 |
| $Al_2O_3$ | 0.10 |
| CaO | 0.20 |
| MgO | 0.09 |
| $SO_3$ | 1.70 |
| $P_2O_5$ | 0.39 |
| MnO | 0.60 |
| Cl | 1.84 |

A further sample derived from the hydrochloric acid mother liquor of a pickling plant was mixed with strontium carbonate in a mix ratio of 1:4.7. The ferric oxide having a purity of approximately 92.2% based upon analysis as shown in Table 4 was sintered at 1150°C for 1½ hours prior to compacting producing a density of 4.5 g/cm³. The sample produced a permanent magnet with an open circuit flux of 580 gauss.

Yet a further sample derived from the hydrochloric acid mother liquor of a pickling plant was mixed with barium carbonate in a mix ratio of 1:3.7. The ferric oxide having a purity of approximately 96.2% based upon analysis as shown in Table 5 was sintered at 1240°C for 1½ hours after compaction to a density of 4.7 g/cm³. The sample, after magnetisation, was found to display an open circuit flux of 420 gauss in the isotropic condition.

Table 5

| Content | Percentage |
| --- | --- |
| FeO | .13 |
| $Fe_2O_3$ | 96.24 |
| $SiO_2$ | .10 |
| $Al_2O_3$ | Trace |
| CaO | .20 |
| MgO | .11 |
| $SO_3$ | .60 |
| $P_2$ | .23 |
| MnO | .57 |

A final sample derived from the hydrochloric acid mother liquor of a pickling plant was mixed with strontium carbonate in a mix ratio of 1:5.0. The ferric oxide having a purity of approximately 96.2% based upon analysis as shown in Table 5 was sintered at 1180°C for 2 hours and after compaction to a density of 4.7 g/cm³, the sample produced a magnet with an open circuit flux of 470 gauss in the isotropic condition.

EXAMPLE 4

Ferric oxide derived from the effluent of an LD Converter was mixed with strontium carbonate in a mix ratio of 1:5.0. The ferric oxide having a purity of approximately 80% based upon analysis as shown in Table 6 was presintered and subsequently sintered at 1150°C for 2 hours after compaction to a density of 4.7g/cm³. The sample, after magnetisation, was found to display an open circuit flux of 320 gauss in the isotropic condition.

Table 6

| Content | Percentage |
| --- | --- |
| $SiO_2$ | 1.43 |
| FeO | 0.45 |
| $Fe_2O_3$ | 80.00 |
| $Ti_2O_3$+Ti | 0.50 |
| MnO | 0.44 |
| CaO | 4.15 |
| MgO | 0.90 |
| $SO_3$ | 0.66 |
| $P_2O_5$ | 0.43 |
| CuO | 0.03 |
| ZnO | 1.40 |
| $CO_2H_2O$ | 0.50 |
| Alkali | 1.20 |

EXAMPLE 5

Ferric oxide derived from the dust of a "Wheellabrator" scale removal apparatus was mixed with strontium carbonate in a mix ratio of 1:3.0. The ferric oxide have a purity of approximately 74% Fe based upon analysis as shown in Table 7 was presintered and subsequently sintered at 1250°C for 2 hours prior to producing a density of 4.4 g/cm³. The sample, after magnetisation, was found to display an open circuit flux of 200 gauss with isotropic condition.

Table 7

| Content | Percentage |
| --- | --- |
| $SiO_2$ | 3.50 |
| $Al_2O_3$ | Zero |
| MnO | 0.19 |
| $P_2O_5$ | 0.06 |
| S | 0.022 |
| Ni | 0.06 |
| Cu | 0.12 |
| Sn | 0.01 |
| Metallic Fe | 17.80 |

EXAMPLE 6

A further sample derived from the hydrochloric acid mother liquor of a pickling plant was mixed with strontium carbonate in a mix ratio of 1:5.0. The ferric oxide having a purity of approximately 98% FeO + $Fe_2O_3$ based upon analysis as shown in Table 8 was presintered and subsequently sintered at 1280°C for 5 minutes after compaction to produce a density of 4.4 g/cm³. The sample, after magnetisation, was found to display an open circuit flux of 360 gauss in the isotropic condition.

A similar sample derived from the hydrochloric acid mother liquor of a pickling plant was mixed with strontium carbonate in a mix ratio of 1:5.0 was sintered at 1300°C for 2 hours after compaction to a density of 4.5 g/cm³. This again produced a magnet with an open circuit flux of 820 gauss in the isotropic condition.

Table 8

| Content | Before Pelletizer |
| --- | --- |
| FeO | 5.93% |
| $Fe_2O_3$ | 89.80% |
| $SiO_2$ | .08% |
| $Al_2O_3$ | .04% |
| CaO | .40% |
| MgO | .11% |

Table 8-Continued

| Content | Before Pelletizer |
| --- | --- |
| S | .10% |
| P | .009% |
| Mn | .26% |
| Total Fe | 67.40% |

Magnets commercially produced at the present time are produced from ferric oxide at least 99% pure with a probable mix ratio of 1:6.0. which is lower than that of the present invention. The magnets so produced have a density of between 4.6 to 4.8 g/cm³ and display isotropy with an open circuit flux of between 800 and 1180 gauss. The open circuit flux of the magnets according to the present invention have acceptable magnetic characteristics even though they are produced from relatively impure ferric oxide starting material which is not specifically selected for reactivity.

Magnets using ferrite according to the present invention may be incorporated into a large number of devices, particularly low cost devices. Examples of these are electric motors, lifting devices, magnetic suspensions of various kinds and a variety of simple domestic and industrial devices such as door fasteners and the like. The ferrite may also be incorporated into static devices, for example, the magnetic rubber sealing strips used to retain refrigerated doors in the closed position.

I claim:

1. A process for producing a ferrite magnetic material of the cubic, hexagonal magnetoplumbite or garnet type comprising mixing with solid, particulate, impure ferric oxide having an $Fe_2O_3$ content between 55 and 96% derived from a process involving iron or steel making or working, an activator in powder form capable of reacting with the ferric oxide to impart to it the required magnetic characteristics selected from the group consisting of compounds of barium, strontium and lead the amount of activator being in sufficient excess of that normally required to react with ferric oxide alone to neutralize or compensate for impurities whereby to render the impurity incapable of degrading the magnetic characteristics of the ferrite, sintering the mixture at a temperature effective to produce the ferrite material, and grinding the sintered material to the required particle size.

2. A process as claimed in claim 1 wherein the ferric oxide is derived from the treatment of iron ore.

3. A process as claimed in claim 1 wherein the ferric oxide is derived from the effluent of a furnace or converter.

4. A process as claimed in claim 3 wherein the ferric oxide is derived from the effluent of a blast furnace, or an open hearth furnace or an oxygen steel-making converter.

5. A process as claimed in claim 1 wherein the ferric oxide is derived from the surface of a steel body during hot working.

6. A process as claimed in claim 1 wherein the excess of activator is:

$$\frac{(100-P(200-P)}{100} + 20\%$$

where P is the percentage purity of the ferric oxide.

7. A process as claimed in claim 1 wherein the activator is the carbonate of strontium, barium or lead.

8. A process as claimed in claim 1 wherein the mixture is sintered within the temperature range 1150°C – 1350°C.

9. A process as claimed in claim 1 wherein the sintered mixture is ground to particle size within the range $1/100\mu - 10\mu$ 10. A process is claimed in claim 1 wherein a quanity of zinc oxide effective to produce a magnetic material of the garnet type is added to the mixture of activator and ferric oxide.

11. A process is claimed in claim 1 wherein the ground sintered mixture is given a second sinter.

12. A process as claimed in claim 11 wherein the second sinter is at a temperature within the range 1200°C – 1400°C.

13. A ferrite magnetic material produced by the method of claims 1.

14. A process for producing a ferrite magnetic material of the cubic, hexagonal magnetoplumbite or garnet type from waste pickle liquor obtained from the pickling of steel in a bath containing hydrochloric acid, comprising driving off water and hydrochloric acid from said pickle liquor to obtain a residue of impure ferric oxide having an $Fe_2O_3$ content between 55 and 96%, mixing with said impure ferric oxide an activator capable of reacting with the ferric oxide to impart to it the required magnetic characteristics selected from the group consisting of compounds of barium, strontium and lead, the amount of activator being in excess of that normally required to react with ferric oxide alone to neutralize or compensate for impurities, sintering the mixture at a temperature effective to produce the magnetic material, and grinding the material to the required particle size.

* * * * *